United States Patent [19]
Garcia

[11] Patent Number: 5,898,791
[45] Date of Patent: Apr. 27, 1999

[54] SPINNING FOCAL PLANE ARRAY CAMERA PARTICULARLY SUITED FOR REAL TIME PATTERN RECOGNITION

[75] Inventor: Joseph P. Garcia, Waldorf, Md.

[73] Assignee: the United States of America as represented by the Secretary of the Navy, Washington, D.C.

[21] Appl. No.: 08/920,289

[22] Filed: Aug. 26, 1997

[51] Int. Cl.⁶ .................................................. G06K 9/00
[52] U.S. Cl. ........................................ 382/103; 382/324
[58] Field of Search .................................. 382/103, 197, 382/199, 216, 321, 323, 324; 348/206

[56] References Cited

U.S. PATENT DOCUMENTS

| | | | |
|---|---|---|---|
| 3,157,855 | 11/1964 | Rabinow | 340/146.3 |
| 3,833,762 | 9/1974 | Gudmundsen | 178/7.1 |
| 4,338,588 | 7/1982 | Chevillat et al. | 340/146.3 H |
| 5,196,688 | 3/1993 | Hesse et al. | 250/203.6 |
| 5,481,269 | 1/1996 | Imhoff et al. | 342/90 |
| 5,504,487 | 4/1996 | Tucker | 342/90 |
| 5,561,431 | 10/1996 | Peele et al. | 342/90 |

FOREIGN PATENT DOCUMENTS

| | | | |
|---|---|---|---|
| 2 568 076 | 1/1986 | France | H04N 1/04 |

OTHER PUBLICATIONS

Flachs et al., "An Automatic Video Tracking System," Proceedings of the IEEE 1977 National Aerospace and Electronics Conf. (NAECON '77), Dayton, OH, May 17–19, 1977, pp. 361–368.

*Primary Examiner*—Andrew W. Johns
*Attorney, Agent, or Firm*—James B. Bechtel, Esq.

[57] ABSTRACT

A computer vision system is disclosed that utilizes a spinning array of photodetectors. The array is rotated about the focal plane of a lens and scans all the possible orientations and positions of the edges of the unknown object. In one embodiment, the photodetectors are elongated so as to provide for maximum light gathering ability along the direction of elongation and a minimum light gathering ability in the direction perpendicular to the direction of elongation. In other embodiments, optical means are used to focus the image onto conventional photodetectors while still having the ability to more efficiently determine edge segments of unknown objects. The system efficiently and rapidly implements the wavelet projection transform to characterize-multi-scale edge segment features of an image of an unknown object. An imaging radar system that utilizes a spinning antenna system having frequency scanning provisions is also disclosed.

14 Claims, 7 Drawing Sheets

SPINNING FOCAL PLANE ARRAY CAMERA PARTICULARLY SUITED FOR REAL TIME PATTERN RECOGNITION

CROSS REFERENCE TO RELATED APPLICATIONS

This application is related to U.S. patent applications Ser. Nos. 08/833,482 and 08/934,012 respectively.

STATEMENT OF GOVERNMENT INTEREST

This invention described herein was made by an employee of the United States Government and may be manufactured and used by or for the Government for governmental purposes without the payment of any royalty thereon or therefor.

FIELD OF THE INVENTION

This invention relates generally to computer vision systems for pattern recognition, automatic target recognition and, more particularly, to a computer vision system having a camera having a spinning focal plane array and in some embodiments spinning optics, and is particularly suited for characterizing the images of unknown objects by decomposing the images into their constituent multi-scale edge segment (MSES) features so as to enhance the pattern recognition of unknown objects.

BACKGROUND OF THE INVENTION

Computer vision systems find many applications in various fields such as automatic target recognition for military purposes, medical systems for the detection of tumors, and security and law enforcement systems for finger print identification and, more recently, face recognition of wanted criminals. The computer vision system typically has a digital camera that detects an unknown object having edge segments and converts the detected unknown object into an image represented by digital quantities that are extensively processed by known pattern recognition techniques so that the unknown object can be classified as being a known object.

Pattern recognition of unknown objects is somewhat hindered in its ability to decompose images of unknown objects into their constituent multi-scale edge segments (MSESs). To better provide for this decomposition, the wavelet projection transforms (WPTs) may be employed in a manner, as more fully described in U.S. patent application Ser. No. 08/833,482. It is further desired to have an efficient high speed hardware implementation of the wavelet projection transform. This implementation would consist of a special camera that outputs direct imagery in the wavelet projection transform domain. This camera would consist of a unique spinning focal plane array, a special read out, and preferably spinning optics.

SUMMARY OF THE INVENTION

It is, therefore, a primary object of the present invention to provide a computer vision system having special imaging devices that provide means for improving the characterization of multi-scale edge segments (MSESs) of unknown objects so as to improve pattern recognition provided by the computer vision system.

It is another object of the present invention to provide an optical camera system for a computer vision system having means for enhancing the gathering of light from the unknown object, especially from the edge segments of the unknown object, so as to improve the pattern recognition provided by the computer vision system.

Another object of the present invention is to provide photodetectors that are shaped in a predetermined manner to intercept the image produced by the optical system so as to provide for enhanced light gathering and correspondingly enhanced pattern recognition.

It is a further object of the present invention to provide improved focusing means for developing the image of an unknown object and to advantageously direct the image onto a focal plane array containing photodetectors having a conventional shape.

Furthermore, it is an object of the present invention to adapt the principles of an improved vision system to that of an imaging radar system so as to enhance the pattern recognition provided by radar systems.

Moreover, it is an object of the present invention to provide an optical system for a computer vision system having a focal plane array containing photodetectors with increased light gathering capability in the direction parallel to particular edges of the unknown object.

Furthermore, it is an object of the present invention to provide for the ability to scan over the range of all possible edge orientations by having the camera, or various components of the camera such as the focal plane and/or certain optics, rotate.

In addition, it is the object of the present invention to provide for a focal plane array readout circuit having the ability to combine output channels from all the photodetector rows into hierarchical arranged output channels and, in addition, apply filtering operations to these channels.

According to the present invention the foregoing and additional objects are attained by a vision system comprising a lens, a focal plane array of photodetectors, means for rotating, means for gathering electrical signals from each photodetector, and means for manipulating and equating the electrical signals to predetermined patterns that identify the unknown object as being a known object. The lens produces an image of an unknown object along the focal plane of the lens. The focal plane array of photodetectors is arranged to intercept the image of the unknown object in a manner such that the photodetectors have highest sensitivity for a preferred orientation of edge features and in one embodiment, the photodetectors thereof have an elongated shape. In all embodiments, each of the photodetectors produces an electrical signal representative of the light intensity of a portion of the image intercepted by a respective photodetector. The means for rotating is connected to and rotates the array of photodetectors about the focal plane of the lens. The means for gathering the electrical signals cooperates with the means for manipulating and equating the gathered electrical signals into predetermined patterns that identify the multi-scale edge segment (MSES) decomposition of the imagery.

DETAILED DESCRIPTION OF THE PREFERRED EMBODIMENTS

Figure 1:
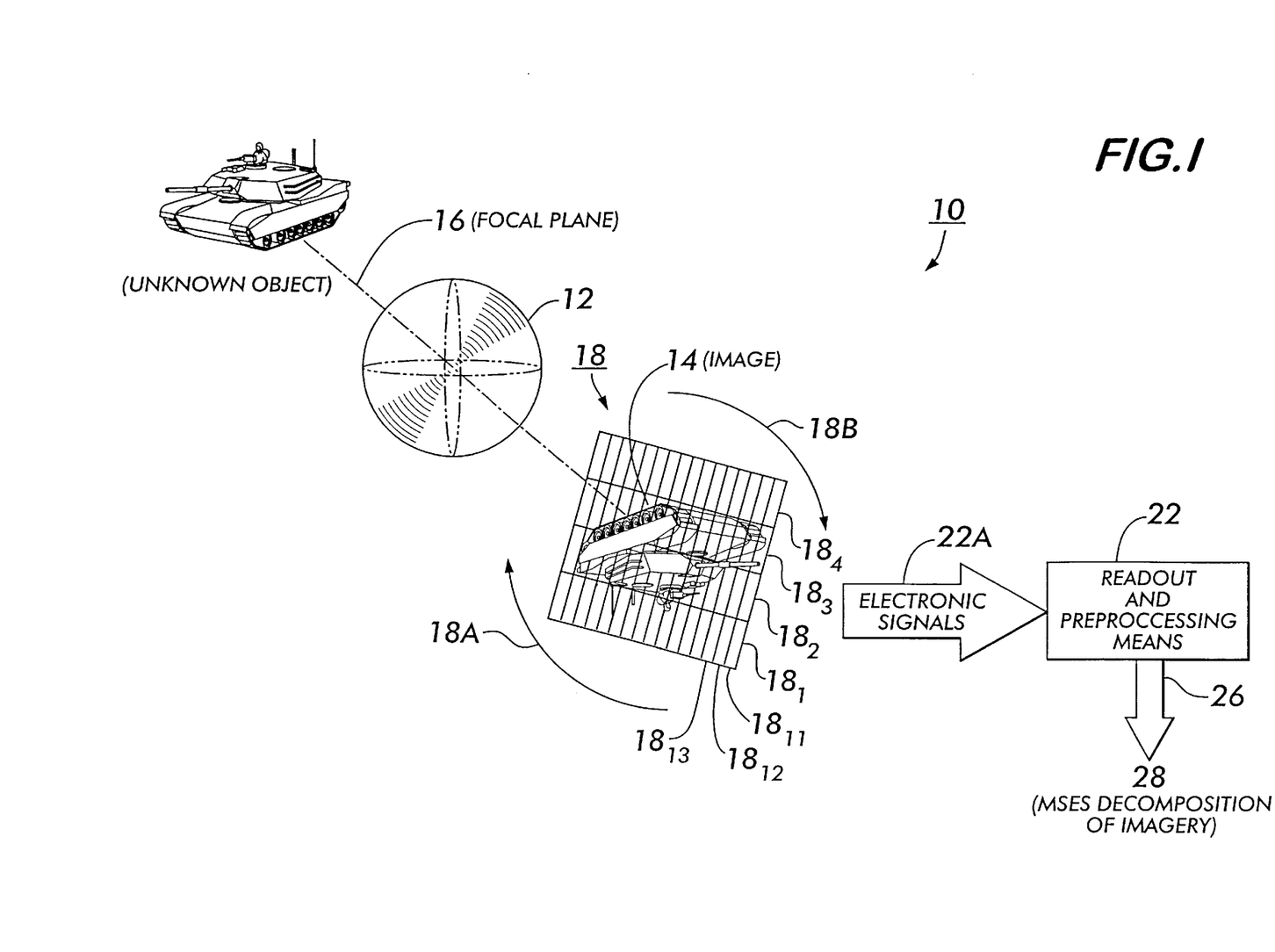
FIG. 1 is a block diagram of the computer vision system 10 of the present invention.

With reference to the drawings, wherein the same reference number indicates the same elements throughout, there is shown in FIG. 1 a block diagram of the computer vision system 10 of the present invention.

The computer vision system 10 comprises a lens 12 which is part of a camera system (not fully shown) that produces an image 14 representative of an unknown object, such as a tank on which the lens 12 is focused. The lens 12 has a focal plane 16 and the focused image 14 is intercepted by an array 18 of photodetectors $18_{11} \ldots 18_{1N}, 18_{21} \ldots 18_{2N}, 18_{31} \ldots 18_{3N}$ and $18_{41} \ldots 18_{4N}$, which for the embodiment of FIG. 1, have an elongated shape. As used herein, the photodetector rows are defined along the direction perpendicular to the direction of elongation of the photodetectors $18_{11} \ldots 18_{1N}, 18_{21} \ldots 18_{2N}, 18_{31} \ldots 18_{3N}$ and $18_{41} \ldots 18_{4N}$, and the columns are defined along the direction of elongation of the photodetectors $18_{11} \ldots 18_{1N}, 18_{21} \ldots 18_{2N}, 18_{31} \ldots 18_{3N}$ and $18_{41} \ldots 18_{4N}$. The array 18 rotates, as indicated by directional arrows 18A and 18B by rotational means, such as a motor having appropriate shafts or clamping arms to engage the array 18 and which constantly turns the array 18 so as to sweep through all possible orientations of the image 14 relative to the orientation of the elongation of the photodetectors $18_{11} \ldots 18_{1N}, 18_{21} \ldots 18_{2N}, 18_{31} \ldots 18_{3N}$ and $18_{41} \ldots 18_{4N}$. The array 18 is rotated about the focal plane 16 of the lens 12.

As will be further described, the computer vision system 10 contains readout and preprocessing means 22, to be further described with reference to FIG. 3, for gathering the electrical signal of each photodetectors $18_{11} \ldots 18_{1N}, 18_{21} \ldots 18_{2N}, 18_{31} \ldots 18_{3N}$ and $18_{41} \ldots 18_{4N}$ and providing electronic signals 22A. The readout and preprocessing means 22 manipulates the gathered electronic signals 22A to implement a wavelet projection transform more fully disclosed in the cross-reference U.S. patent application Ser. No. 08/833,482. Wavelet techniques are known and some of which are disclosed in U.S. Pat. Nos. 5,481,269; 5,504,487; and 5,561,431, all of which are herein incorporated by reference.

Images of objects, such as the unknown object 14, containing edge segments having various orientations on the focal plane 16. The lens 12, in cooperation with its associated camera optical system, produces the image 14 at the focal plane 16. The rotation of the array 18 causes the elongated photodetectors $18_{11} \ldots 18_{1N}, 18_{21} \ldots 18_{2N}, 18_{31} \ldots 18_{3N}$ and $18_{41} \ldots 18_{4N}$ to change their orientation sensitivity of edges as a function of the array's orientation. More particularly, as the array 18 rotates, the array 18 scans all the possible orientations and positions of the edge segments in the image 14. Specifically, the elongated photodetectors $18_{11} \ldots 18_{1N}, 18_{21} \ldots 18_{2N}, 18_{31} \ldots 18_{3N}$ and $18_{41} \ldots 18_{4N}$ have the maximum light gathering ability along their direction of elongation and the minimum light gathering ability in the direction perpendicular to their direction of the elongation. When the orientation of a photodetector $18_{11} \ldots 18_{1N}, 18_{21} \ldots 18_{2N}, 18_{31} \ldots 18_{3N}$ and $18_{41} \ldots 18_{4N}$ matches the orientation of a given edge segment image impinging upon it, the maximum light gathering capability coincides with the maximum or minimum irradiance due to the edge segment, maximum or minimum depending on whether the edge is bright against a dark background or dark against a bright background. At each instantaneous orientation, the lengthwise direction of the photodetectors defines the integration direction while the perpendicular direction defines the transverse integration. Light impinging on the photodetectors $18_{11} \ldots 18_{1N}, 18_{21} \ldots 18_{2N}, 18_{31} \ldots 18_{3N}$ and $18_{41} \ldots 18_{4N}$ creates the data in the form of some electronic signals 22A which is directed to the focal plane array readout and preprocessor means 22 that is directed so as to implement a wavelet projection transform (WPT) in a manner which may be further described with reference to the block diagram of FIG. 2.

Figure 2:
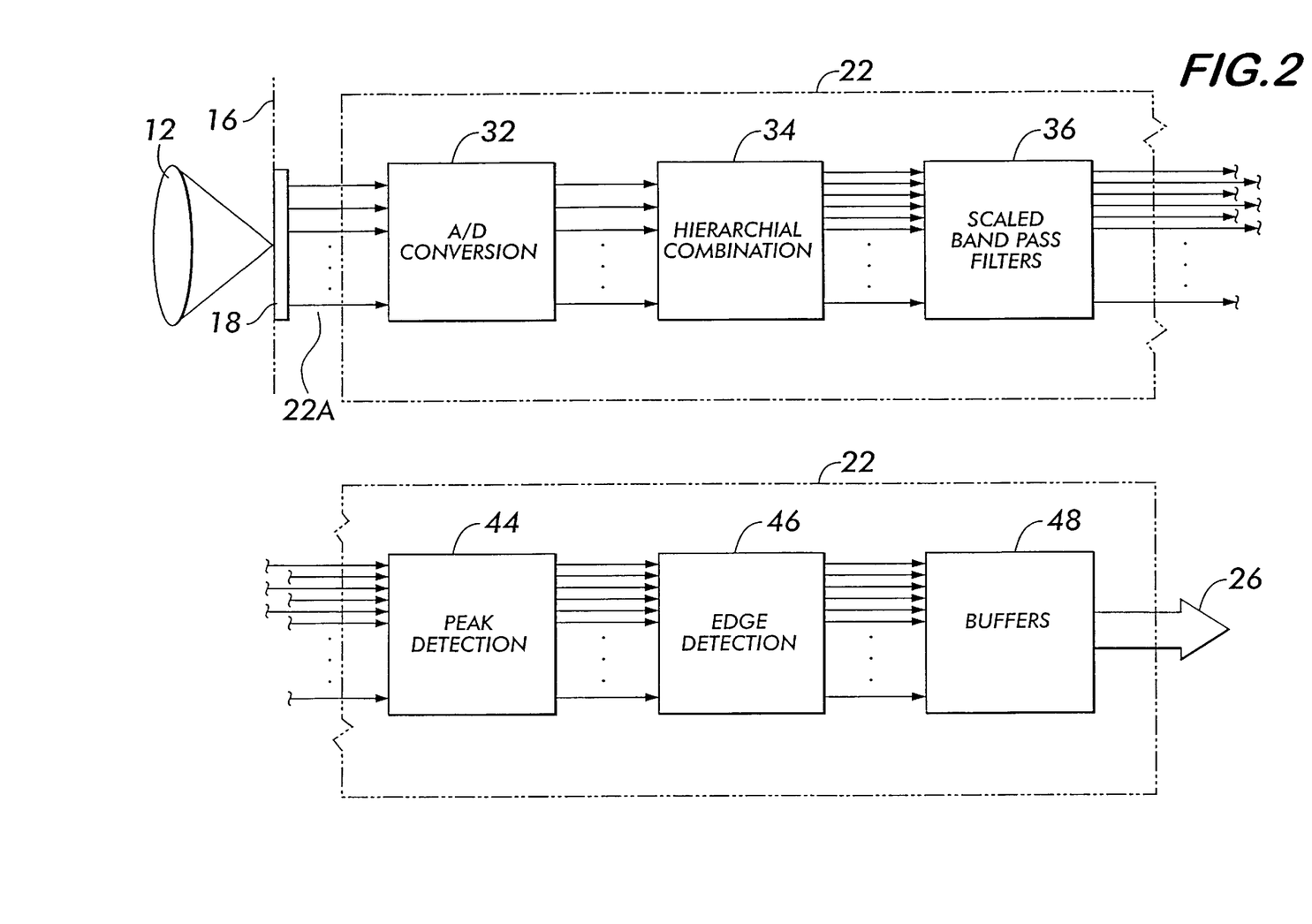
FIG. 2 illustrates some of the essential elements of the processing of FIG. 1.

As shown in FIG. 2, the readout and preprocessing 22 segment comprises functional units 32, 34 and 36 where 32 represents an array of analog-to-digital (A/D) converters, segment 36 represents an array of scaled bandpass filters, and segment 34 represents an array of hierarchial combiners. Segment 32 accepts the analog electronic signals 22A that are created on the focal plane 16 by the action of lens 12 focusing the unknown object 14 onto the photodetector array 18. As previously described, the analog electronic signals 22A are produced by the photodetector array 18. The action of segments 32, 34 and 36 implements the Wavelet Projection Transform (WPT) as further described in U.S. patent application Ser. No. 08/833,482. The readout and preprocessor means 22 further comprises segments 44, 46 and 48 wherein segment 44 receives the output of segment 36. Segments 44 and 46 apply further operations for the identification of MSESs on the WPT data stream where segment 44 is an array of peak detection units and segment 46 is an array edge detection units. The edge detection segment 46 takes various patterns of peaks produced by the peak detector segment 44 and determines if the pattern of peaks constitutes MSESs as further described in U.S. patent application Ser. No. 08/833,482. The output of the edge detector segment is stored in a buffer segment 48 to be subsequently routed to other processing units described in U.S. patent applications Ser. Nos. 08/833,482 and 08/934,012. The above functional units of FIG. 1 and FIG. 2 are further described in FIG. 3, showing their implementation to individual data channels on an example having four (4) rows of photodetectors $18_{11} \ldots 18_{1N}, 18_{21} \ldots 18_{2N}, 18_{31} \ldots 18_{3N}$ and $18_{41} \ldots 18_{4N}$.

Figure 3:
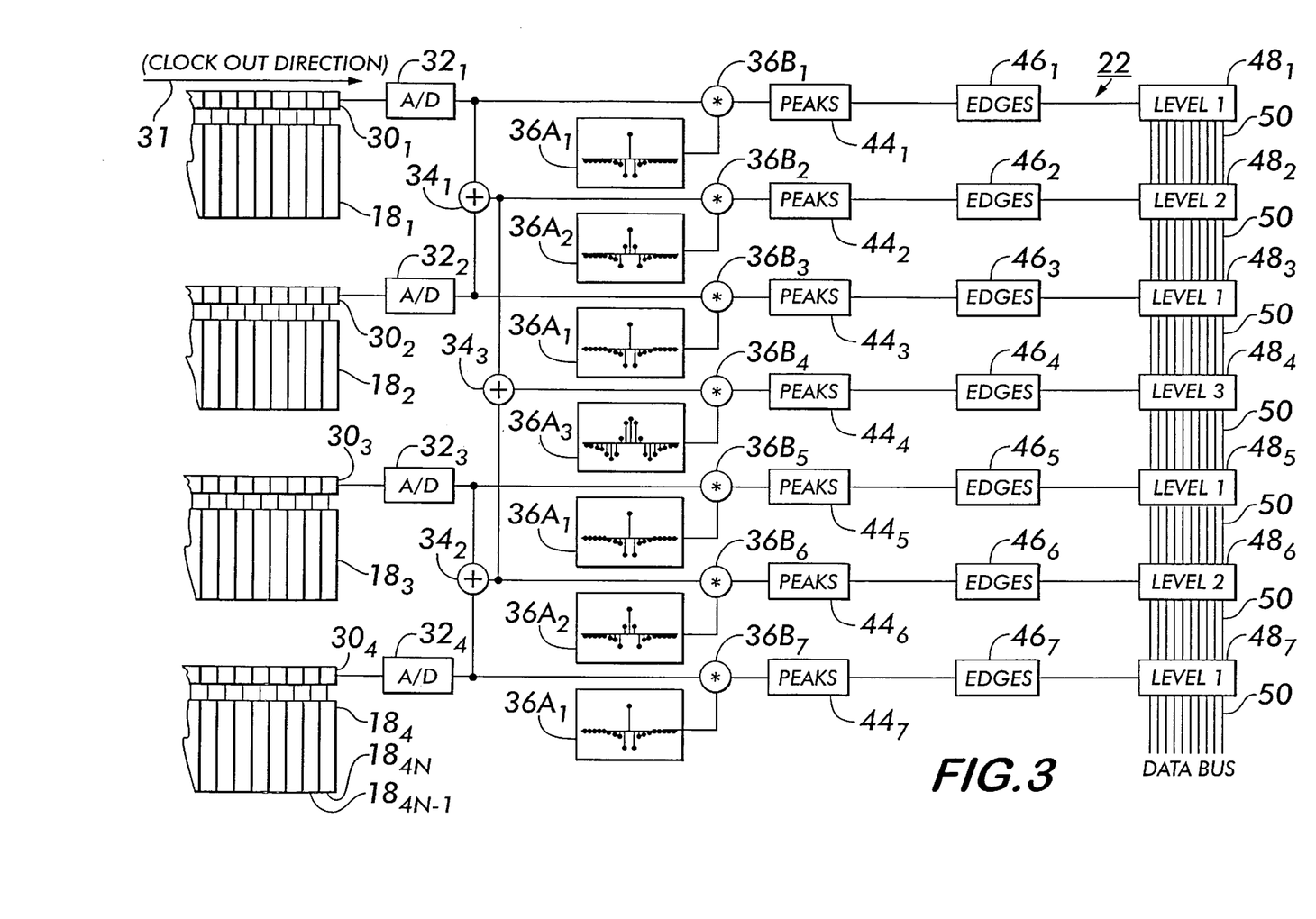
FIG. 3 illustrates a circuit arrangement for accomplishing the processing of FIG. 2.

In general, and as to be more fully described, the arrangement 22 of FIG. 3 utilizes the information captured by the focal plane array of photodetector devices having parallel output channels and operating along rows of photodetectors representing the transverse integration direction. In the example of the preferred embodiment shown in FIG. 3, four (4) rows $18_1, 18_2, 18_3$ and $18_4$ of photodetectors are shown. However, this device can be extended to an arbitrary number of photodetector rows so long as the number is a power of two (2). The arrangement 22 has charged coupled device serial shift registers $30_1, 30_2, 30_3$ and $30_4$ operating along the rows of photodetectors $18_1, 18_2, 18_3$ and $18_4$ representing the transverse integration direction. Each register element of the serial shift registers receives input from a corresponding photodetector $18_{11} \ldots 18_{1N}, 18_{21} \ldots 18_{2N}, 18_{31} \ldots 18_{3N}$ and $18_{41} \ldots 18_{4N}$ in the adjacent photodetector array. The serial shift registers develop output signals for each of the rows of the array of photodetector devices and develop corresponding output signals that serve as output channels. Further, analog-to-digital converters receive the output channel signals of the serial shift registers and provide digital signals representative thereof. The arrangement 22 further has means for establishing a hierarchy of the digital signals by summing two or more neighboring channels representing the photodetector rows. This summing process continues to create additional channels which are summed together to create additional channels. The summing of channels continue over a predetermined number of levels until there is only one channel representing the highest level. The arrangement 22 further includes bandpass filters having predetermined center frequencies corresponding to the levels of the hierarchy.

More particularly, FIG. 3 illustrates CCD serial shift registers $30_1$, $30_2$, $30_3$, and $30_4$ which, in turn, have their outputs routed to analog-to-digital converters $32_1$, $32_2$, $32_3$ and $32_4$. Each row of the photodetector array 18 has a corresponding serial shift register $30_1$, $30_2$, $30_3$ and $30_4$ and receives a signal from a corresponding photodetector $18_{11} \ldots 18_{1N}$, $18_{21} \ldots 18_{2N}$, $18_{31} \ldots 18_{3N}$ and $18_{41} \ldots 18_{4N}$. The rows of photodetectors $18_{11} \ldots 18_{1N}$, $18_{21} \ldots 18_{2N}$, $18_{31} \ldots 18_{3N}$ and $18_{41} \ldots 18_{4N}$ in photodetector array 18 define parallel output channels, via their associated serial shift registers $30_1$, $30_2$, $30_3$ and $30_4$, that connect in parallel to corresponding analog-to-digital converters $32_1$, $32_2$, $32_3$ and $32_4$.

FIG. 3 further illustrates segment 34 for establishing a hierarchy of the digital signals comprising combiners $34_1$, $34_2$ and $34_3$ which generate additional digital signal channels parallel to the output channels of the analog-to-digital converters $32_1$, $32_2$, $32_3$ and $32_4$. Two combiners $34_1$ and $34_2$ combine two respective pairs of output channels $32_1$ and $32_2$, and $32_3$ and $32_4$. A third combiner $34_3$ combines the output channels of the first two combiners $34_1$ and $34_2$. The hierarchal summation means 34 preserves the four (4) input channels but adds three (3) additional channels, as seen in FIG. 3, representing combined channels.

As further shown in FIG. 3, the output channels of the analog-to-digital converters $32_1$, $32_2$, $32_3$ and $32_4$, in conjunction with the output channels of combiners $34_1$, $34_2$ and $34_3$, are bandpassed filtered by the means of segment 36 consisting of convolution units $36B_1$, $36B_2$, $36B_3$, $36B_4$, $36B_5$, $36B_6$ and $36B_7$ using digital filter functions respectively stored in buffers $36A_1$, $36A_2$ and $36A_3$. The filtered outputs of the convolution units $36B_1$, $36B_2$, $36B_3$, $36B_4$, $36B_5$, $36B_6$ and $36B_7$ are respectively applied to the peak detectors $44_1$, $44_2$, $44_3$, $44_4$, $44_5$, $44_6$ and $44_7$ (known in the art) which, in turn, respectively apply their outputs to edge detectors $46_1$, $46_2$, $46_3$, $46_4$, $46_5$, $46_6$ and $46_7$ whose function is further explained in patent application Ser. No. 08/833,482. The outputs of the edge detectors $46_1$, $46_2$, $46_3$, $46_4$, $46_5$, $46_6$ and $46_7$ corresponding to MSESs are applied to buffers $48_1$, $48_2$, $48_3$, $48_4$, $48_5$, $48_6$ and $48_7$. The outputs of the buffers $48_1$, $48_2$, $48_3$, $48_4$, $48_5$, $48_6$ and $48_7$ are routed via data bus 50 to other processing elements to be described.

As stated previously, the number of rows must be a power of two (2). The number of levels is related to the number of rows. For the above example there are three levels, the first level corresponding to the four A/D output channels, the second level corresponding to the two output channels of the two first level combiners $34_1$, $34_2$ and the third level corresponding to the one output channel of the single second level combiner $34_3$. In general, the number of combiners of segment 34 and distinct reference signals related to the bandpass filters segment 36 are equal to the number of levels. In general the maximum number of levels is the log base two (2) of the number of rows of photodetectors $18_{11} \ldots 18_{1N}$, $18_{21} \ldots 18_{2N}$, $18_{31} \ldots 18_{3N}$ and $18_{41} \ldots 18_{4N}$ plus one (1). In general, the maximum number of channels and associated convolution units in segment 36, the maximum number of channels and associated peak detection units in segment 44, edge detection units in segment 46 and output buffers in segment 48 is $2^N + 2^{N-1} + 2^{N-2} + \ldots + 2^0$, where N is the number of levels. In general the maximum number of combiners in segment 34 is $2^{N-1} + 2^{N-2} + \ldots + 2^0$.

The buffers $48_1$, $48_2$, $48_3$, $48_4$, $48_5$, $48_6$ and $48_7$ of segment 48 represent MSESs in a hierarchial arrangement where the odd numbered buffers $48_1$, $48_3$, $48_5$ and $48_7$ contain the highest spatial frequency edges sampled directly by the photodetector rows $18_1$, $18_2$, $18_3$ and $18_4$, buffers $48_2$ and $48_6$ contain lower spatial frequency MSESs corresponding to the pointwise summations of photodetector rows $18_1$ and $18_2$, and $18_3$ and $18_4$ respectively, and finally, buffer $48_4$ contains the lowest MSESs corresponding to the pointwise summation of rows $18_1$, $18_2$, $18_3$ and $18_4$ of the photodetectors $18_{11} \ldots 18_{1N}$, $18_{21} \ldots 18_{2N}$, $18_{31} \ldots 18_{3N}$ and $18_{41} \ldots 18_{4N}$.

FIG. 3 further illustrates bandpass filters consisting of filter functions of $36A_1$, $36A_2$ and $36A_3$, and convolution units $36B_1$, $36B_2$, $36B_3$, $36B_4$, $36B_5$, $36B_6$ and $36B_7$ that are respectively related to hierarchy levels one ($48_1$, $48_3$, $48_5$, and $48_7$), two ($48_2$ and $48_6$) and three ($48_4$). The bandpass filter functions $36A_1$, $36A_2$ and $36A_3$ pass the frequency, which corresponds to the spatial frequency of the unknown object 14 per instantaneous orientation being focused on by lens 12, and being sampled by the associated analog-to-digital converter $32_1$, $32_2$, $32_3$ and $32_4$, or represented in the channels of combiners $34_1$, $34_2$ and $34_3$ to which the convolution units $36B_1$, $36B_2$, $36B_3$, $36B_4$, $36B_5$, $36B_6$ and $36B_7$ are interconnected as shown in FIG. 3.

Each level in buffers $48_1$, $48_2$, $48_3$, $48_4$, $48_5$, $48_6$ and $48_7$ may be implemented by storage devices such as a register or a storage location in a memory device of a conventional computer. The buffer outputs consisting of the hierarchial levels one ($48_1$, $48_3$, $48_5$ and $48_7$), two ($48_2$ and $48_6$) and three ($48_4$) are routed to other processing elements via data bus 50 and generally indicated in FIGS. 1 and 2 with reference number 26, which after further processing, results in MSES decomposition of imagery 28 shown in FIG. 1. The output along data bus 50 for ½ rotation (0–180 deg.) of an image, such as image 14, represents the wavelet projection transform (WPT) described in U.S. patent application Ser. No. 08/833,482. The peak detection elements $44_1$, $44_2$, $44_3$, $44_4$, $44_5$, $44_6$ and $44_7$ and edge detection elements $46_1$, $46_2$, $46_3$, $46_4$, $46_5$, $46_6$ zero out the non-peaks and non-edges portions of the data streams on the various channels. If it is appropriate for the purpose of saving cost and complexity, these two elements may be omitted and their respective functions implemented by a general purpose computer connected to data bus 50. This will, however, sacrifice speed.

In operation, the serial shift registers $30_1$, $30_2$, $30_3$ and $30_4$ receive an electrical signal from respective photodetectors $18_{11} \ldots 18_{1N}$, $18_{21} \ldots 18_{2N}$, $18_{31} \ldots 18_{3N}$ and $18_{41} \ldots 18_{4N}$ and produce electrical charge signals with the accumulation thereof comprising electronic signals 22A in a manner known to the art. The electrical charge signals are responsive to a clock signal (not shown) so as to establish a cycle having a beginning and an end point for extracting the charges corresponding to various pixels in a manner known to the art. The serial shift registers $30_1$, $30_2$, $30_3$ and $30_4$ provide output signals at the end point of the cycle that are representative of the accumulated charge stored during the cycle. During an integration cycle, charges build up in the serial shift register $30_1$, $30_2$, $30_3$ and $30_4$. The charge in each of the serial shift registers $30_1$, $30_2$, $30_3$ and $30_4$ is proportional to the light intensity falling on the respective photodetectors which it serves. Upon the completion of the integration cycle, the accumulated charge is shifted out in the clock out direction 31 (see FIG. 3) of the serial shift registers $30_1$, $30_2$, $30_3$, ... $30_4$ to the respective analog-to-digital converter $32_1$, $32_2$, $32_3$ and $32_4$. Each of the analog-to-digital converters digitizes its received signal in a manner known to the art, creating a digital data channel which represents the light intensity of the portion of the image 14 that intercepts the respective elongated photodetector row $18_1$, $18_2$, $18_3$ and $18_4$.

The digital outputs of the analog-to-digital converters $32_1$, $32_2$, $32_3$ and $32_4$ are combined in a hierarchial manner into groups of two as shown in FIG. 3. This hierarchial combination is equivalent to the downsampled recursive application of a low pass section of a Haar Wavelet filter bank, known in the art, along columns defined by the array 18, i.e., the integration direction. A more general purpose hierarchial combination of data streams would involve weighted combinations of three or more adjacent channels of analog-to-digital converters of segment 32. In the generalized example each combiner of segment 34 would combine three (3) or more contiguous channels where the signal amplitudes from the various channels to be combined would be weighted. Depending on the number of channels and the values of the weights, any type of digital low pass filter may be applied recursively with downsampling upon the columns of the array 18. These low pass filters may be the low pass section of any discrete wavelet transform filter bank, known in the art. This would permit the implementation of the wavelet projection transform (WPT) method described in U.S. patent application Ser. No. 08/833,482.

A digital data stream representative of the intensity of the image 14 intercepted by the photodetectors $18_{11}$ ... $18_{1N}$, $18_{21}$ ... $18_{2N}$, $18_{31}$ ... $18_{3N}$ and $18_{41}$ ... $18_{4N}$ is produced by the analog-to-digital converters at each point in the hierarchy. More particularly, the digital stream of data at the outputs of the analog-to-digital converters $32_1$, $32_2$, $32_3$ and $32_4$ is routed, as shown in FIG. 3, to each level ($48_1$, $48_2$ and $48_3$) by the means 34 for establishing the hierarchy As further seen in FIG. 3, the digital stream of data is operatively combined with the bandpass filter functions of $36A_1$, $36A_2$ and $36A_3$ via the convolution units $36B_1$, $36B_2$, $36B_3$, $36B_4$, $36B_5$, $36B_6$ and $36B_7$ arranged as shown in FIG. 3. The bandpass filter functions of $36A_1$, $36A_2$ and $36A_3$ are preferably finite impulse response (FIR) filters known in the art that implement wavelet transforms on the data channels.

The center frequency, the inverse of this quantity being known as a scale, of a given filter function of $36A_1$, $36A_2$ and $36A_3$ used by a particular digital convolution unit $36B_1$, $36B_2$, $36B_3$, $36B_4$, $36B_5$, $36B_6$ and $36B_7$ is a function of the associated data channel's level on the hierarchy. For example, the filter function of $36A_3$ associated with level three (channel of buffer $48_4$) in the hierarchy has a center frequency one half of that of the filter function of $36A_2$ associated with the level two (channel buffers $48_2$ and $48_6$) in the hierarchy. Similarly, the filter function of $36A_2$ has a center frequency one half of that of the filter function of $36A_1$ associated with the level one (channel buffers $48_1$, $48_3$, $48_5$ and $48_7$) in the hierarchy. The analog-to-digital converters $32_1$ ... $32_4$ are selected to sample or pass a band of frequencies of analog signals with the center frequency thereof corresponding to the highest spatial frequency of signals being detected by the computer vision system 10, that is, the analog signals representing the unknown objects being detected, such as unknown object 14. The bandpass filter functions of $36A_1$, $36A_2$ and $36A_3$ form a filter bank that decomposes the unknown object 14 according to the spatial frequencies of its edges at various orientations and positions across the image of the unknown object 14.

Implementations other than that shown in FIG. 3 are possible. For example, an active pixel readout system, known in the art, may replace the serial shift registers $30_1$, $30_2$, $30_3$ and $30_4$ and A/D converters $32_1$, $32_2$, $32_3$ and $32_4$. In another example, the filtering in the hierarchial combination shown in FIG. 3 may be implemented in an analog manner at the photodetector level, that is, at the output of the photodetectors $18_{11}$ ... $18_{1N}$, $18_{21}$ ... $18_{2N}$, $18_{31}$ ... $18_{3N}$ and $18_{41}$ ... $18_{4N}$ of the array 18 by local coupling circuitry known in the art. Furthermore, multiple serial shift registers per row of photodetectors $18_{11}$ ... $18_{1N}$, $18_{21}$ ... $18_{2N}$, $18_{31}$ ... $18_{3N}$ and $18_{41}$ ... $18_{4N}$ may be implemented so as to hold or delay the readouts for various levels. In the example of FIG. 3, peak detection circuitry comprising elements $44_1$, $44_2$, $44_3$, $44_4$, $44_5$, $44_6$ and $44_7$ of FIG. 3 is preferably implemented to reduce the output requirements since the peak detection circuitry will only provide peak outputs therefrom. More particularly, the peak detectors may be selected to only provide an output if the input at a particular instant contains a peak so as to only provide outputs for meaningful signals, thus, reducing the amount of processing requirements needed to service the outputs.

It should now be appreciated that the practice of the present invention provides for elongated photodetectors $18_{11}$ ... $18_{1N}$, $18_{21}$ ... $18_{2N}$, $18_{31}$ ... $18_{3N}$ and $18_{41}$ ... $18_{4N}$ having a maximum light gathering ability along the direction of elongation previously referred to as the integration direction and minimum light gathering ability along the direction perpendicular to the direction of elongation previously referred to as transverse integration direction. When the orientation of the photodetectors $18_{11}$ ... $18_{1N}$, $18_{21}$ ... $18_{2N}$, $18_{31}$ ... $18_{3N}$ and $18_{41}$ ... $18_{4N}$ matches the orientation of a given edge segment of the image 14 of the unidentified object the maximum light gathering capability coincides with the maximum or minimum irradiation due to the edge segment. The present invention also provides for alternate embodiments not having the need for elongated photodetectors, and the first of which may be further described with reference to FIG. 4.

Figure 4:
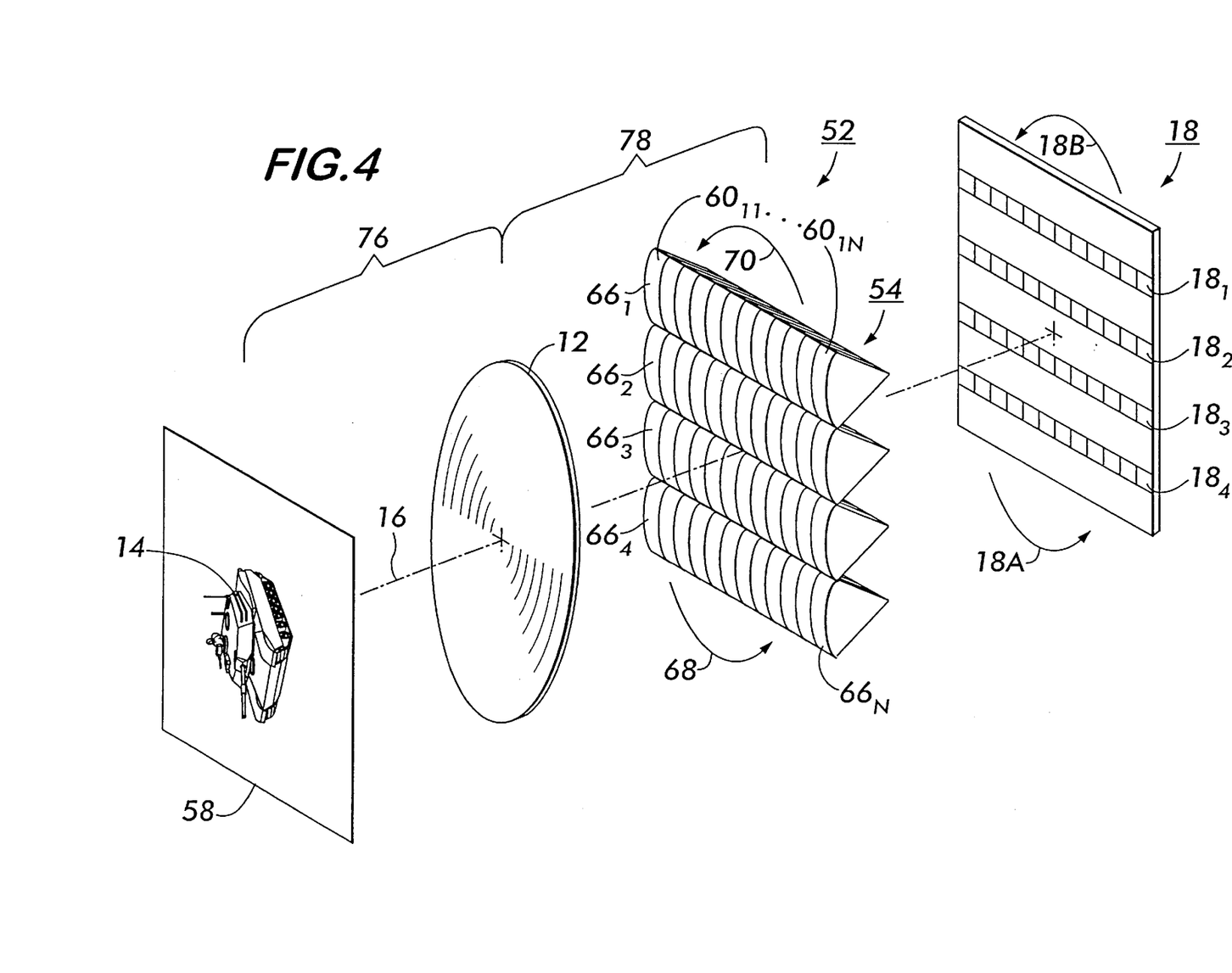
FIG. 4 illustrates an alternate embodiment of the optical system employed by the computer vision system of the present invention.

FIG. 4 illustrates an optical arrangement 52 comprising the lens 12 of FIG. 1, an array 54 of microlenses, and an array 18 of photodetectors which, unlike those of FIG. 1, are of a conventional square shape. The optical arrangement 52 focuses on the unknown object 14, such as a tank, which is at an object plane 58. The array 54 serves as the means for focussing and reducing the image 14 so that it may be intercepted by the array 18 comprised of photodetectors having the conventional square shape. The outputs of the photodetectors of the array 18 are routed to the readout circuitry of FIG. 3 in a manner similar to the photodetectors $18_{11}$ ... $18_{1N}$, $18_{21}$ ... $18_{2N}$, $18_{31}$ ... $18_{3N}$ and $18_{41}$ ... $18_{4N}$ of the array 18 previously described.

The microlenses array 54 comprises a plurality of rows of microlenses $60_1$, $60_2$, $60_3$ and $60_4$ each of which is made up of a plurality of microlenses, such as $60_{11}$ ... $60_{1N}$ as shown in FIG. 4. Each of the microlenses $60_{11}$ ... $60_{1N}$, $60_{21}$ ... $60_{2N}$, $60_{31}$ ... $60_{3N}$ and $60_{41}$ ... $60_{4N}$, is a tapered slab shape with a rounded face having the plane of the slab oriented parallel to the integration direction. Each microlense intercepts a portion of the light rays making up the image of the unknown object 14 at its rounded edge face and focuses the light along the tapered direction confined to the plane of the slab. The microlenses array 54 is attached to and rotated by rotational means, such as that described for FIG. 1, in the directions indicated by directional arrows 68 and 70.

The array 18 of photodetectors in actuality has an abutting relationship with the rear portion of the microlenses array 54 and each photodetector produces an electrical signal representative of the light intensity of the portion of the image, such as image 14, intercepted by the respective microlenses of the array 54 abutting a respective photodetector. More particularly, the microlenses rows $60_1$, $60_2$, $60_3$ and $60_4$ have their rear portions of their microlenses $60_{11} \ldots 60_{1N}$, $60_{21} \ldots 60_{2N}$, $60_{31} \ldots 60_{3N}$ and $60_{41} \ldots 60_{4N}$, respectively, impressed and abutting against corresponding photodetectors $18_{11} \ldots 18_{1N}$, $18_{21} \ldots 18_{2N}$, $18_{31} \ldots 18_{3N}$ and $18_{41} \ldots 18_{4N}$ of the array 18. The array 18 is attached to and rotated by rotational means, such as that described for FIG. 1, so that it is rotated in directions indicated by directional arrows 18A and 18B.

The lens 12 is positioned from the unknown object 14 by an effective distance 76 equal to optical infinity for the unknown object 14. The focal length of the lens 12 is indicated in FIG. 4 by the distance 78. It should be noted that the rows of microlenses $60_1$, $60_2$, $60_3$ and $60_4$ of the microlenses array 54 are oriented in the transverse integration direction. Further details of each of the microlenses $60_{11} \ldots 60_{1N}$, $60_{21} \ldots 60_{2N}$, $60_{31} \ldots 60_{3N}$ and $60_{41} \ldots 60_{4N}$ of the microlenses array 54 may be further described with reference to FIG. 5. In general, there could be an arbitrary number of rows of microlenses $60_1 \ldots 60_M$ yielding an arbitrary number of microlenses $60_{11} \ldots 60_{1N}, \ldots 60_{M1} \ldots 60_{MN}$. A focal plane array readout mechanism identical to the one shown in FIG. 3 is used for this arbitrary number.

Figure 5A:
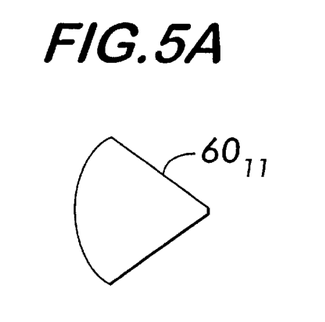
FIGS. 5 and 6 illustrate further details of the elements shown in FIG. 4.
Figure 5B:
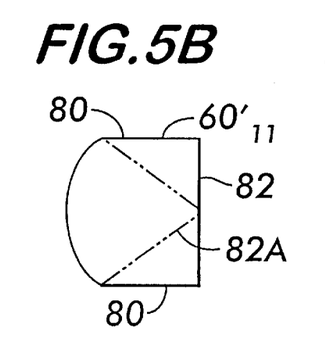
Figure 5C:
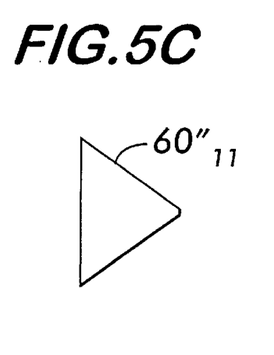

FIG. 5 is composed of FIGS. 5(A) and 5(B) and 5(C) respectively representing the side views of respective microlenses, such as microlense $60_{11}$ having a tapered geometry, microlense $60_{11}'$ having a non-tapered geometry and microlense $60_{11}''$ having a flat face and a tapered geometry. As seen in FIG. 5(A), the tapered microlense $60_{11}$ has a cylindrical face and has a peak at its tapered portion which, as previously described with reference to FIG. 4, abuts against its respective photodetector of array 18.

As seen in FIG. 5(B) the non-tapered microlense $60_{11}'$ also has a cylindrical face with the upper and lower edges thereof that longitudinally extend therefrom, as indicated by reference number 80, and terminate in the form of a rectangular rear portion 82 which abuts against a respective photodetector of array 18. As further seen in FIG. 5(B), in actuality the non-tapered microlense $60_{11}'$ focuses the intercepted light rays from the unknown object 14 into a tapered pattern 82A (shown in phantom) before delivering the light rays to the respective photodetector of array 18. The flat face microlense $60_{11}''$ has sides that are highly reflective to light. The implementation of either of the microlenses, but preferably that of microlense $60_{11}$ of FIG. 5(A), may be further described with reference to FIG. 6.

Figure 6A:
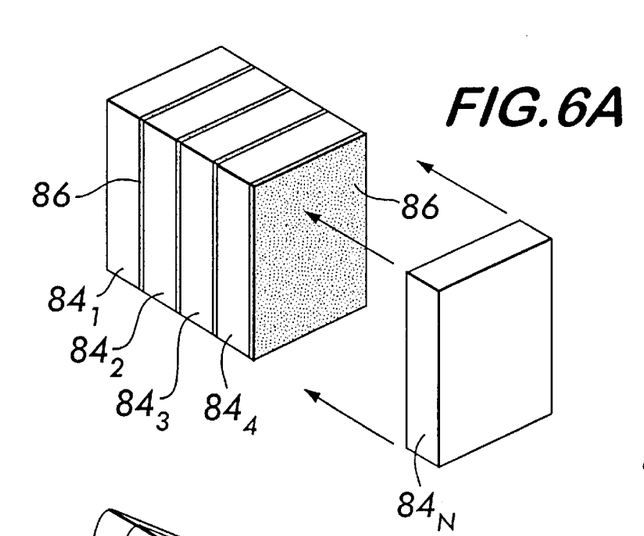
Figure 6B:
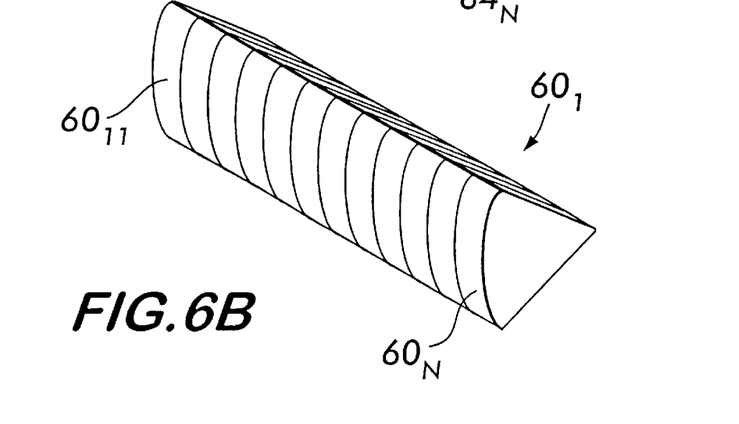

FIG. 6 is composed of FIGS. 6(A) and 6(B), wherein in FIG. 6(A) illustrates a plurality of glass slabs $84_1$, $84_2$, $84_3 \ldots 84_N$ that are glued together with an appropriate glue 86. FIG. 6(B) illustrates the cylindrical array 60 comprised of elements $60_{11} \ldots 60_{1N}$ that have been ground down or shaped in a manner known in the art. The glue 86 has an index of refraction less than that of the glass. This causes the confinement of light within the thickness of the glass slabs by the principle of trapped internal reflection due to the shallow grazing angle with respect to the plane defined by the slab of glass comprising the microlense. Therefore light propagates through each microlense in a slab waveguide propagation mode along the transverse integration direction while converging to a focus along the integration direction.

It should now be appreciated that the practice of the present invention provides for various embodiments and allows for the light rays contained within the image 14 to be directed and focused onto a photodetector having a conventional shape. More particularly, the embodiments of FIGS. 4, 5 and 6 comprise preferable optical systems that allow for the use of conventional photodetectors while still enhancing the detection of the edge segments of the unknown objects of the present invention.

The principles of the present invention hereinbefore described with reference to FIGS. 1–6 associated with a computer vision system 10 are also applicable to an imaging radar system 88 illustrated in FIGS. 7 and 8. As is known, when radio waves impinge on objects such as ships, airplane and land masses, a portion of the radiant energy is reflected back toward its source. In radar systems, energy is emitted from a transmitter in short duration pulses. The reception of reflected pulses serves to indicate the presence of an object along the travel path of the waves. The distance of the object from the radar may be ascertained by measurement of the round-trip travel time of the pulses. However, in the imaging radar system 88, to be described, range data is not used. Instead, the object is "painted" with pulses of radio frequency (RF) electro-magnetic waves at a high repetition rate relative to a conventional radar, of which some is backscattered generating a reflectivity image of the object.

Figure 7:
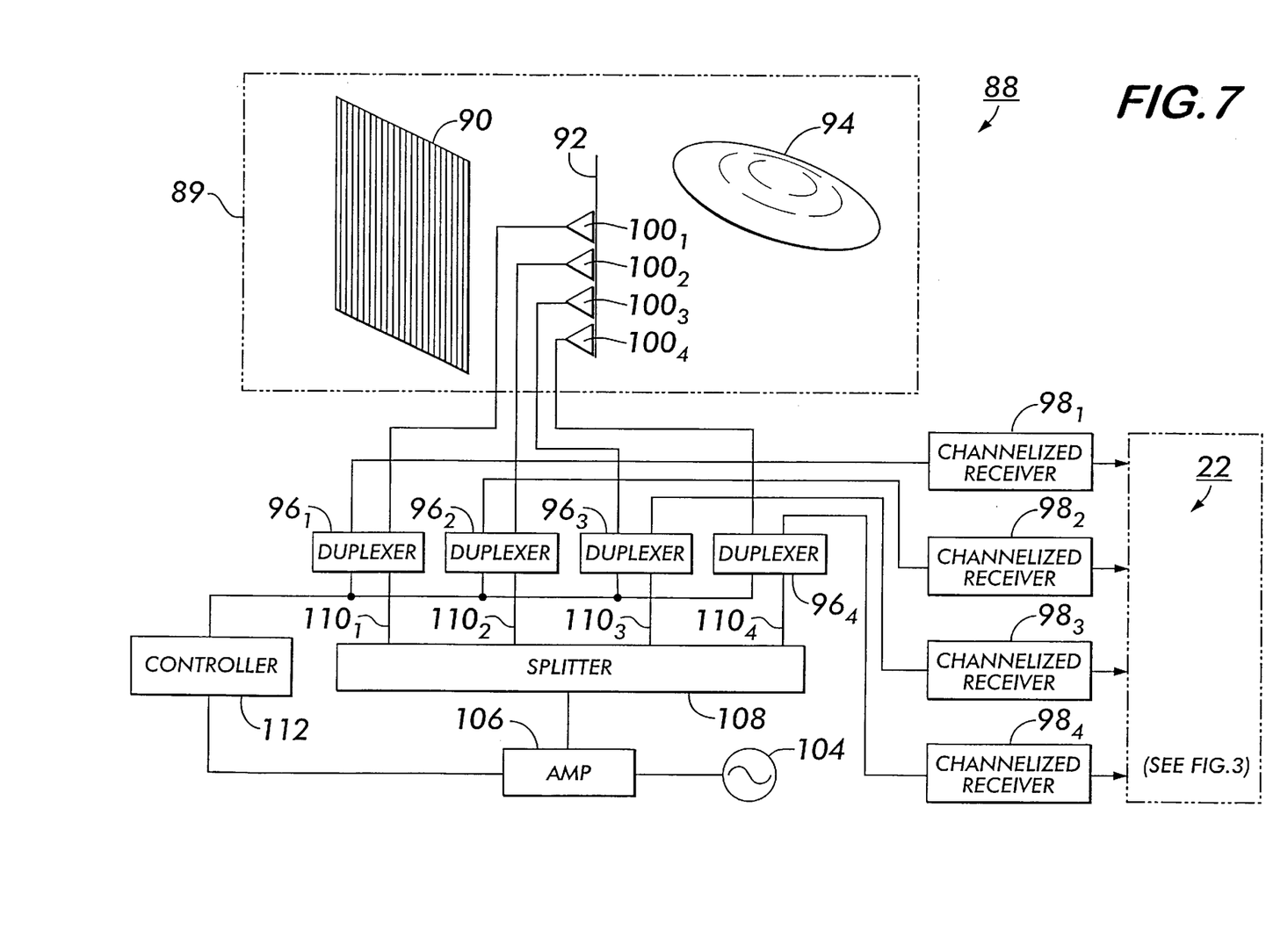
FIGS. 7 and 8 cumulatively illustrate a radar system employing the principles of the present invention.
Figure 8:
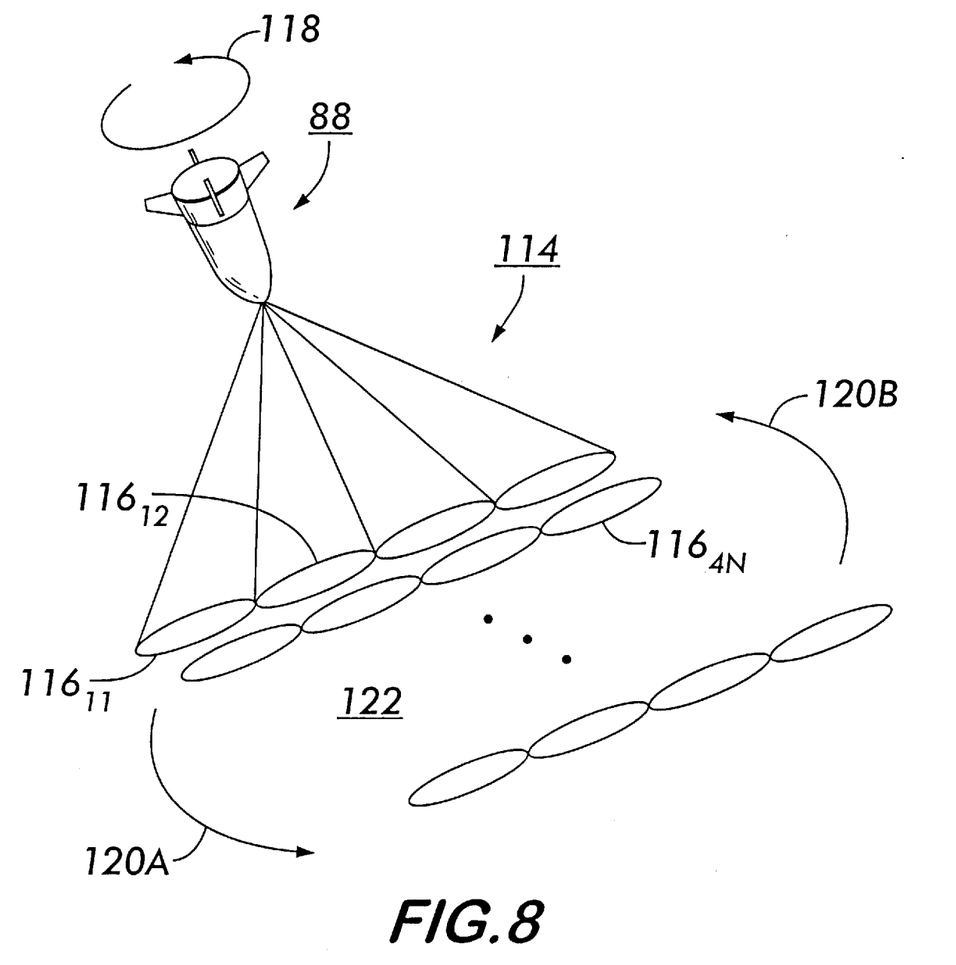

FIG. 7 illustrates the imaging radar system 88 with antenna unit 89 comprising a RF grating 90, a feeder array 92 containing a plurality of feeds $100_1$, $100_2$, $100_3 \ldots 100_4$, and a "dish" type reflector 94. The antenna unit 89 is connected to electronics consisting of a plurality of duplexers $96_1$, $96_2$, $96_3 \ldots 96_4$, a plurality of channelized receivers $98_1$, $98_2$, $98_3 \ldots 98_4$, a signal generator 104, power amplifier 106, signal splitter 108 and controller unit 112. All the above components are known in the art of RF engineering.

Signals originating at the signal generator 104 are directed to the amplifier 106, which under the influence of the controller 112 imparts a high power square envelope modulation upon the signal. The modulated signal is then conveyed to the splitter 108. The split signal is routed to the duplexers $96_1$, $96_2$, $96_3 \ldots 96_4$ which, under the influence of the controller 112, direct the high power signal to the connected feeds $100_1$, $100_2$, $100_3 \ldots 100_4$ while simultaneously isolating the channelized receivers $98_1$, $98_2$, $98_3 \ldots 98_4$ from the high power transmitted signal. This is the transmit phase of the imaging radar system 88. For the receive phase of the imaging radar system 88, signals entering the feeds $100_1$, $100_2$, $100_3 \ldots 100_4$ are routed via the duplexers $96_1$, $96_2$, $96_3 \ldots 96_4$ to the channelized receivers $98_1$, $98_2$, $98_3 \ldots 98_4$. As will soon be described, the digital outputs of the channelized receivers $98_1$, $98_2$, $98_3 \ldots 98_4$ replace the digital output quantities of the A/D converters $32_1$, $32_2$, $32_3 \ldots 32_4$ shown in FIG. 3. The operation of means 22 described with reference to FIG. 3 is equally applicable to the operation of the imaging radar system 88 of FIGS. 7 and 8.

A wide-band signal generated by a source 104 is applied to each of the feeds $100_1$, $100_2$, $100_3 \ldots 100_4$. The position of the feeds $100_1$, $100_2$, $100_3 \ldots 100_4$ on the feed array 92, in relation to the dish reflector 94, determines the beam direction in the integration direction which corresponds to the orientation of the feed array 92. The RF grating 90 is located in front of the feed array 92 and has means for providing frequency scanning through diffraction so that different frequencies are directed to different directions along the transverse integration direction perpendicular to the orientation of the feed array 92.

For sampling the reflected signals emanating from the object, each feed $100_1$, $100_2$, $100_3 \ldots 100_4$ has channelized receivers $98_1$, $98_2$, $98_3$ ... $98_4$ associated with it via the duplexers $96_1$, $96_2$, $96_3$ ... $96_4$. Because the direction of a signal on a given channel is a function of the frequency, the channelized receivers $98_1$, $98_2$, $98_3$ ... $98_4$, permit the resolving of the directions in the transverse integration direction corresponding to the associated feed $100_1$, $100_2$, $100_3$ ... $100_4$. The frequency bins represented in the channelized receivers $98_1$, $98_2$, $98_3$ ... $98_4$ are outputted in a digital data stream analogous to the digital data streams. The readout and signal processing architecture of the imaging radar system embodiment 88 is identical with the previously described optical embodiment of FIG. 3, with the exception that the serial shift registers $30_1$, $30_2$, $30_3$ and $30_4$ and analog/digital converters $32_1$, $32_2$, $32_3$ and $32_4$ are omitted due to their functionality being contained in the channelized receivers $98_1$, $98_2$, $98_3$ ... $98_4$. The signals of channelized receivers $98_1$, $98_2$, $98_3$ ... $98_4$ are processed by the same means 22 for establishing a hierarchy of channels already shown and described with reference to FIG. 3.

The multiple feeds $100_1$, $100_2$, $100_3$ ... $100_4$ generate a beam pattern 114 that forms (as seen in FIG. 8) a plurality of rows of far-field spots $116_1$, ... $116_4$, which, when the imaging radar system 88 is rotated in the direction 118 corresponding to directions 120A and 120B, produces a rotation of the above pattern. The dish reflector 94 and feeds $100_1$, $100_2$, $100_3$ ... $100_4$ are designed so that the far field spots $116_{11}$ ... $116_{1N}$, $116_{21}$ ... $116_{2N}$, $116_{31}$ ... $116_{3N}$ and $116_{41}$ ... $116_{4N}$ are elongated in the integration direction by shaping the reflector in a manner known in the art.

The imaging radar system 88 uses the principle of the reflectivity of resolvable objects in the far field identified by the far-field spots $116_{11}$ ... $116_{1N}$, $116_{21}$ ... $116_{2N}$, $116_{31}$ ... $116_{3N}$ and $116_{41}$ ... $116_{4N}$, to implement the determination of the reflectivity of the image. The means for establishing the hierarchy and containing the bandpass filter functions $36_{A2}$, and $36_{A3}$ of FIG. 3 provides for the utilization of the principles of the present invention to establish the hierarchy of the digital signals on the digital data stream of the channelized receivers $98_1$, $98_2$, $98_3$ ... $98_4$ along the transverse integration direction corresponding to the orientation of the multiple feeds $100_1$ ... $100_4$. This allows for the implementation of the wavelet projection transform, as described in U.S. patent application Ser. No. 08/833,482, of the radar reflectivity image of the object. Analogous to the optical embodiment of FIG. 3, the imaging radar embodiment of FIG. 7 may be expanded to an arbitrary number of channels corresponding to the rows of far field spots by incorporating an arbitrary number of feeds, duplexers and channelized receivers.

It should now be appreciated that the practice of the present invention provides for an imaging radar system 88 having means 42 for establishing a hierarchy of digital signals from multi-feeds which produce elongated spots in the far field that change orientation and position with the rotation of the antenna 89.

In the practice of the present invention a spinning camera may be used to produce multi-scale edge feature (MSES) decompositions of imagery 28 shown in FIG. 1, such as the unknown object, for military targets so as to implement automatic target recognition (ATR). In the practice of the present invention, a wavelet projection transform is performed on the set of images, such as image 14, that represent all possible aspect views of the target, such as that made allowable by the spinning camera of the present invention. The principles embodied in the wavelet projection transform make it possible to produce a shift, scale and rotationally invariant representation of the image pattern, of the unknown object. The cross-referenced U.S. patent application Ser. No. 08/833,482 may be referenced for further details of invariant representations of image patterns.

Some of the variations and modifications of the present invention may be readily apparent to those skilled in the art in light of the above teaching. It is, therefore, to be understood that, within the scope of the appended claims, the invention may be other than as specifically described herein.

What I claim is:

1. A vision system for performing a multi-scale edge feature decomposition of an unknown object having edge segments comprising:
   (a) a lens for producing an image of said unknown object along a focal plane of said lens;
   (b) a focal plane array of photodetectors arranged to intercept said image of said unknown object, said photodetectors having an elongated shape and each producing an electrical signal representative of light intensity of a portion of said image intercepted by a respective elongated photodetector;
   (c) means for rotating said array of elongated photodetectors about said focal plane of said lens;
   (d) means for gathering said electrical signal of each photodetector; and
   (e) means for manipulating said gathered electrical signals so as to decompose said portion of said image into its constituent multi-scale edge feature and then equating said constituent multi-scale edge feature to predeterminal patterns that identify said unknown object as being a known object.

2. A vision system for performing a multi-scale edge feature decomposition of an unknown object having edge segments comprising:
   (a) a lens for producing an image of said unknown object along a focal plane of said lens;
   (b) a focal plane array of photodetectors arranged to intercept said image of said unknown object, said photodetectors having an elongated shape and each producing an electrical signal representative of light intensity of a portion of said image intercepted by a respective elongated photodetector;
   (c) means for rotating said array of elongated photodetectors about said focal plane of said lens;
   (d) means for gathering said electrical signal of each photodetector, said means for gathering comprising;
      (i) serial shift registers receiving the electrical signals of said photodetectors and operating along rows of photodetectors of said focal plane array representing the transverse integration direction, said serial shift registers developing output signals for each of said rows of said photodetectors serving an output channel thereof;
      (ii) analog-to-digital converters respectively receiving said output channel signals of said serial shift registers and providing digital signals representative thereof;
      (iii) means for establishing a hierarchy of said digital signals by summing two or more channels representing said photodetector rows of which the sum creates additional channels which are summed together to create additional channels, said summing of channels continuing over a predetermined number of levels until there is only one channel representing the highest level; and
      (iv) bandpass filters having predetermined center frequencies corresponding to said levels of said hierarchy and;

(e) means for manipulating and equating said gathered electrical signals to predeterminal patterns that identify said unknown object as being a known object.

3. The vision system according to claim 2, wherein said photodetectors, said serial shift registers and said analog-to-digital converters are arranged into a plurality of horizontal rows each having a plurality of vertical columns and wherein said means for establishing a hierarchy comprises a plurality of combiners forming a plurality of hierarchial increasing levels.

4. The vision system according to claim 3, wherein said unknown object has edges of spatial scales corresponding to various spatial frequencies and said predetermined center frequencies of said bandpass filters are selected to be inversely proportional to said hierarchial increasing levels, and the center frequency of a higher hierarchial level being one-half of that of the next lower hierarchial level, said bandpass filters forming a filter bank that decomposes the unknown object according to the spatial frequencies of its edges at various orientations and positions across the image of the unknown object.

5. The vision system according to claim 4, wherein said bandpass filters have operational responses representative of a wavelet mathematical function.

6. The vision system according to claim 5, wherein said wavelet mathematical function is a wavelet projection transform.

7. A vision system for detecting an unknown object having edge segments comprising:

(a) a lens for producing an image on said unknown object along a focal plane of said lens;

(b) means for focussing and reducing said image along said focal plane;

(c) an array of photodetectors arranged to intercept said reduced image of said unknown object, each of said photodetectors producing an electrical signal representative of light intensity of a portion of said image intercepted by a respective photodetector;

(d) means for rotating said means for focussing and reducing and said array of photodetectors about said focal plane of said lens;

(e) means for gathering said electrical signal of each photodetector and;

(f) means for manipulating and equating said gathered electrical signals to implement a multi scale edge feature decomposition of the image of the unknown object.

8. The vision system according to claim 7, wherein said means for gathering comprises;

(a) serial shift registers receiving the electrical signals of said photodetectors and operating along rows of photodetectors of said focal plane array representing the transverse integration direction, said serial shift registers developing output signals for each of said rows of said photodetectors serving an output channel thereof;

(b) analog-to-digital converters respectively receiving said output channel signals of said serial shift registers and providing digital signals representative thereof;

(c) means for establishing a hierarchy of said digital signals by summing two or more channels representing said photodetector rows of which the sum creates additional channels which are summed together to create additional channels, said summing of channels continuing over a predetermined number of levels until there is only one channel representing the highest level; and (d) bandpass filters having predetermined center frequencies corresponding to said levels of said hierarchy.

9. The vision system according to claim 8, wherein said serial shift registers and said analog-to-digital converters are arranged into a plurality of horizontal rows each having a plurality of vertical columns and wherein said means for establishing a hierarchy comprises a plurality of combiners forming a plurality of hierarchial increasing levels.

10. The vision system according to claim 9, wherein said unknown object has a spatial frequency and said predetermined center frequencies are selected to be inversely proportional to said hierarchial increasing levels, said predetermined center frequencies having a highest frequency which corresponds to said spatial frequency of said unknown object, and the center frequency of a higher hierarchial level being one-half of that of the next lower hierarchial level.

11. A vision system according to claim 7, wherein said means for focussing and reducing comprises an array of microlenses having front and rear portions and each thereof having a face serving as a front portion arranged to intercept a respective portion of said image of said unknown object and a rear portion arranged to abut against a respective portion of said array of photodetectors.

12. The vision system according to claim 11, wherein each of said microlenses of said array comprises a plurality of wedge lenses transversely arranged relative to said focal plane with each wedge lens having a cylindrical face arranged to intercept said respective portion of said image of said unknown object and a peak of its tapered portion abutting a respective photodetector.

13. The vision system according to claim 11, wherein each of said microlenses of said array comprises a plurality of lens having a cylindrical face arranged to intercept said respective portion of said image of said unknown object with upper and lower edges of said face longitudinally extending therefrom and terminating to form a rectangular rear portion abutting a respective photodetector.

14. The vision system according to claim 12, wherein each of said microlenses has light reflective sides.

* * * * *